US009432471B1

(12) United States Patent
Boshy et al.

(10) Patent No.: US 9,432,471 B1
(45) Date of Patent: Aug. 30, 2016

(54) RECOMMENDATION SOURCE-RELATED USER ACTIVITY CALCULATOR

(71) Applicant: Outbrain Inc., New York, NY (US)

(72) Inventors: Shlomy Boshy, Nes Ziona (IL); Yaron Galai, New York, NY (US)

(73) Assignee: Outbrain Inc., New York, NY (US)

( * ) Notice: Subject to any disclaimer, the term of this patent is extended or adjusted under 35 U.S.C. 154(b) by 245 days.

(21) Appl. No.: 14/266,171

(22) Filed: Apr. 30, 2014

(51) Int. Cl.
*G06F 15/16* (2006.01)
*H04L 29/08* (2006.01)

(52) U.S. Cl.
CPC .................................. *H04L 67/22* (2013.01)

(58) Field of Classification Search
CPC ............ G06Q 30/02; G06Q 30/0241; G06Q 30/0269; G06F 9/445; G06F 17/30156
See application file for complete search history.

(56) References Cited

U.S. PATENT DOCUMENTS 6,976,003 B1 * 12/2005 Hamor .................. G06Q 30/02
705/14.46

* cited by examiner

*Primary Examiner* — Kim T Nguyen
(74) *Attorney, Agent, or Firm* — Lowenstein Sandler LLP

(57) ABSTRACT

Identifying impressions relating to a target publisher that are related to or derived from a user interaction with a content recommendation source. User activity data for multiple users is collected during an activity window. Based on the collected user activity data, an initial interaction by a user with a source is identified and used to establish a source-related user session beginning at a time of the initial interaction and ending after a session period. A set of impressions (e.g., page views) by the user relating to the target publisher occurring during the user session is identified. The identified set of impressions is associated with the user session. A source-related user activity measurement is calculated based on the identified user sessions and associated impressions occurring during the activity window.

9 Claims, 5 Drawing Sheets

… (US 9,432,471 B1)

RECOMMENDATION SOURCE-RELATED USER ACTIVITY CALCULATOR

TECHNICAL FIELD

The present disclosure relates to content recommendations and, more particularly, to a technique of measuring the quality of content recommendations for provisioning to users.

BACKGROUND

In the electronic content publishing industry, it is desirable for a content publisher (e.g., a website provider) to present its users not only with interesting, relevant, trustworthy and engaging content in an initial form (e.g., a webpage), but also provide users of the publisher's content with additional recommended content. Furthermore, it is a goal for a content publisher to provide its users with high "quality" recommendations. To do so, an approach is needed to accurately and efficiently measure the quality of those recommendations.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
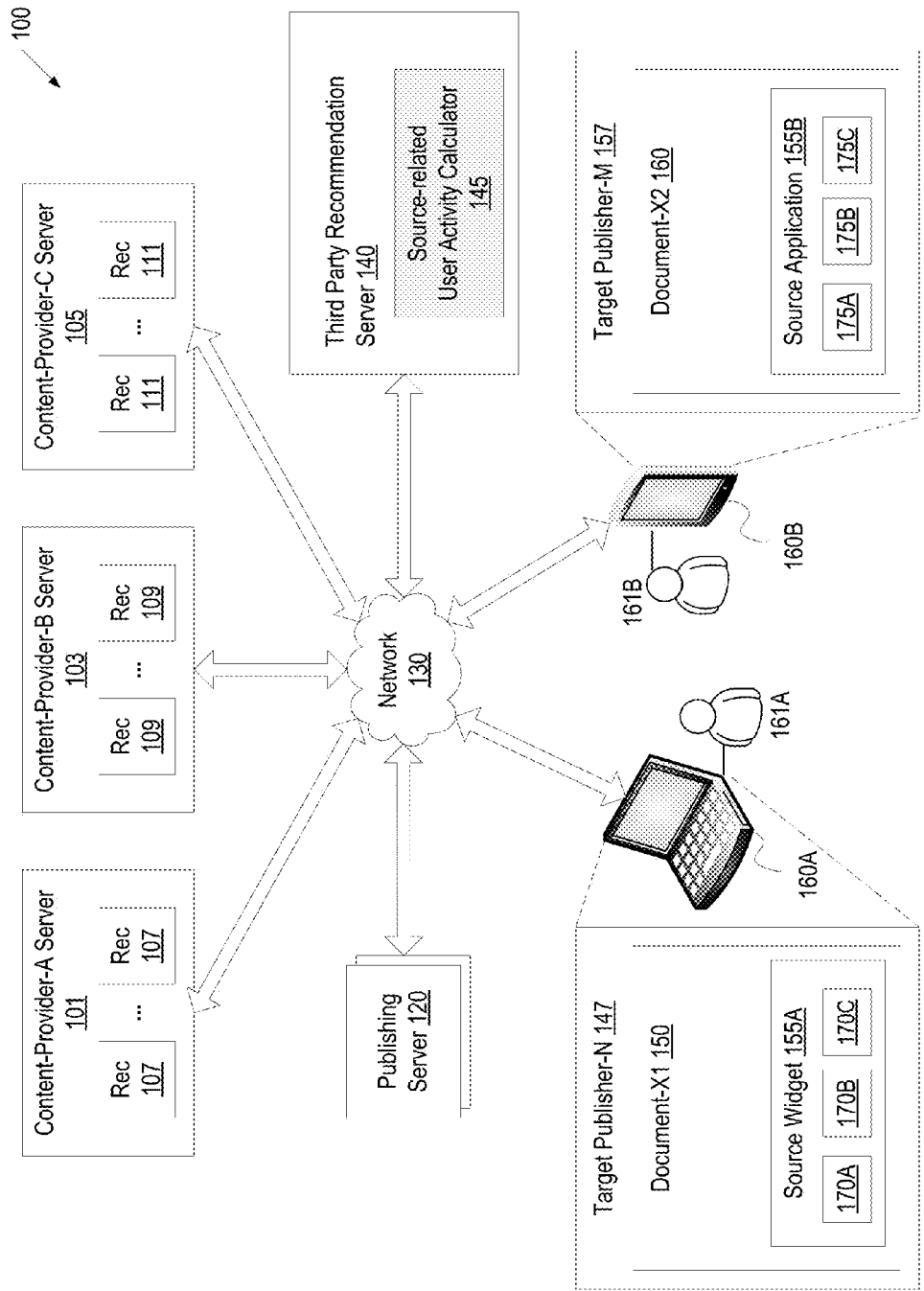
FIG. 1 illustrates an example system architecture in which examples of the present disclosure can be implemented.

A system and method for calculating a measurement of user engagement relating to recommendations provided by a recommendation source (also referred to as a "recommendation source" or "source") is described, according to various implementations. Content providers (also referred to as a "target publisher" publishing content via a document (also referred to as a "target document") may include or be associated with a recommendation source configured to provide one or more content recommendations. A content recommendation or recommendation hereinafter refers to a representation of digital content. A recommendation can include one or more text, links, thumbnails, images, icons, videos, documents, files, etc. A document hereinafter refers to any electronic presentation of content, including, for example, a webpage, a mobile application graphical user interface (GUI), etc.

In an embodiment, user activity data associated with multiple users is collected during an activity window. The activity window may be any suitable time period, such as, for example, 24 hours, 25 hours, etc. The collected user activity data includes a set of interactions by one or more users with a source associated with a target publisher and a set of impressions (e.g., visits, page views) associated with the target publisher occurring during the activity window.

In an embodiment, from the collected user activity data, a user engagement measurement may be determined which tracks a particular user's activity relating to the target publisher which is associated with or derived from an interaction with the source. For example, the source may be a widget or other application presented within the target publisher's environment which includes one or more links to recommended content which may be interacted with (e.g., clicked on) by a user.

Upon identification of a user interaction with the source, a user session is identified. In an embodiment, the user session begins at a time of the initial user interaction with the source and ends after a selected time period (herein referred to as a "session period"). In an embodiment, the one or more impressions relating to the target publisher which occur during the user session (e.g., during the time from the interaction with the source through the end of the session period) are identified. A user engagement measurement, referred to as a "source-related user activity measurement", is calculated based on the identified user's activity (e.g., impressions) occurring during the user session beginning with a source-related user interaction. Advantageously, the source-related user activity measurement represents a measure of an average quantity of user activity (e.g., impressions) relating to the target publisher that are associated with, related to, and/or derived from the initial interaction by a user with the source during the activity window. In an implementation, the source-related user activity measurement represents an average quantity of source-related user activities (e.g., impressions) by a particular user per user session during the activity window.

For example, a target publisher (e.g., a content provider), such as a news web site, may wish to provide a user visiting a web page of the web site (e.g., Document X) with one or more recommendations related to Document X (i.e., the target document). The content provider (e.g., the news web site publisher) may use a recommendation source (e.g., a third party recommendation service provider) to generate one or more content recommendations in connection with the target document (i.e., Document X). In this regard, when a user visits a target document published by a content publisher, a filtered content recommendation may be generated and provisioned by the third party recommendation service provider in connection with the target document. The source may be embodied as a widget or other application accessible via the target publisher's website. A user may interact (e.g., click) on a recommendation link provided via the source's widget in order to access recommended content and initiate a user session, according to embodiments of the present disclosure.

The present disclosure describes efficient and optimal techniques for effectively measuring user engagement relating to a target publisher which is associated with and/or derived from a user's interaction with a recommendation source. For example, user activities (e.g., impressions) relating to the target publisher occurring within a session period of an initial interaction with the source may be associated with each other and tracked. In an implementation, a user engagement measurement (i.e., a source-related user activity measurement) may be calculated which identifies a set of impressions (e.g., visits, clicks, etc.) by a user within the session period, beginning from a time of an interaction with the source (e.g., a click on a link provided via the source's widget).

According to implementations, user activity data may include any implicit or explicit data associated with a user's electronic actions or activity including, but not limited to, document visits, clicks on a widget or application, scrolling of document sections, pointing device (e.g., mouse or keyboard) movements, clicks or other indications, a time of activity relating to a document (e.g., a webpage and/or web site), a listing of web sites visited by a user, languages a user reads, viewing a document link (e.g., a recommendation) but not interacting with the link (e.g., time spent hovering over the link), special interest indicators such as "thumbs up" indications or "thumbs down" indications, user explicit data such as categories, etc.

According to implementations, the source-related user activity measurement may be calculated for organic recommendations (e.g., a source-related recommendation within one or more websites associated with the target publisher) or as a paid recommendation to an external website (e.g., a paid content site). According to implementations, the recommendation source may be delivered in any suitable framework, such as, for example, within or in connection with a target website, via a website widget, etc.

FIG. 1 illustrates an example system architecture 100 in which examples of the present disclosure can be implemented. The system architecture 100 can include one or more user devices 160A-B, one or more content provider servers 101,103,105, one or more destination servers (e.g., publishing servers 120) and one or more third party recommendation servers 140 coupled to each other over one or more networks 130.

A publisher may have recommendation opportunities they wish to have populated or served with a content recommendation. According to implementations, the target publisher 147, 157 may include documents 150,160 rendered with a recommendation source (e.g., source widget 155A, source application 155B). For example, the target publisher (147, 157) may provide a document (e.g., Document-X1 150, Document-X2 160) associated with a source 155A, 155B of content recommendations 107, 109, 111 from one or more of the content providers 101, 103, 105. A target document 150, 160 may be for example, and is not limited to, a website homepage, section front, web page, mobile application user interface (UI), gaming application UI, television application UI, etc.

The source 155A, 155B may be presented to a user 161A, 161B in any suitable fashion, such as, for example, as a widget (155A) or as another application (155B). The source 155A, 155B presents content recommendations 170 (e.g., content recommendations 170A, 170B, 170C, 175A, 175B, and 175C) to the user 161A, 161B. The user 161A, 161B may interact with a desired content recommendation to select the desired content (e.g., content provided by the target publisher or an external website or content provider (e.g., a paid content site) and establish a source-related user session.

The content recommendation 170 can be a representation of digital content. Digital content can include, for example, such as, and not limited to, an article, a web blog entry, a social media posting, a data feed, an advertisement, a document (e.g., webpage), digital video, digital movies, digital photos, digital music, social media updates, electronic books (ebooks), electronic magazines, digital newspapers, digital audio books, electronic journals, electronic comic books, software applications, etc.

A content recommendation host or "publisher" 101, 103, 105 hereinafter refers to an entity and/or platform hosting candidate documents (e.g., webpages, mobile application graphical user interfaces (GUIs), gaming application GUIs, television application GUIs, etc.) 107,109,111. For example, SportsNews, Inc. and BaseballNews, Inc. may be publishers. The publisher platforms can include publishing servers 120. The publisher servers 120 can be application servers that provide one or more applications (e.g., web application, mobile application, desktop application, gaming console applications, television console application, etc.). The publishing servers 120 can be coupled to one or more data stores that store publisher data and/or recommendations of content providers. In an implementation, the content providers may wish to publish their respective recommendations 107,109, 111 in widespread locations (e.g., document 150, document 160). In an example, the content providers can use the service hosted by the third party recommendation service provider to have the recommendations 107,109,111 of the content providers served to populate the recommendations 170, 175 provided via the recommendation source 155A, 155B in association with a document 150, 160 of the target publisher 147, 157.

The third party recommendation service provider can host one or more third party recommendation servers 140 to provide the service to the content providers and target publishers. The servers 140 include the source-related user activity calculator 145 configured to calculate source-related user activity measurements. The source-related user activity calculator 145 is a software component (e.g., a set of instructions residing in a memory) executable by one or more processing devices to perform the collaborative filtering activities described herein (e.g., the methods described in detail in connection with FIGS. 3-4). The instructions of the source-related user activity calculator 145 may reside in a memory including any suitable computer readable storage medium, such as volatile memory devices (e.g., random access memory (RAM)), non-volatile memory devices (e.g., flash memory), a magnetic hard disk, a Universal Serial Bus (USB) solid state drive, a local disk, an external disk, and/or other types of memory devices).

The network of content providers can include, for example, multiple candidate recommendations 107,109,111 that may be stored in one or more data stores that are coupled to the network 130. The architecture 100 can include, for example, multiple documents 150,160 that are accessed by multiple users 161A-B on various user devices 160A-B.

For example, a target publisher 147 may present a document 150 having a source widget 155A configured to provision content recommendations to a user 161A in response to an interaction by the user 161A with the source widget 155A (e.g., a click on a link presented by the source widget 155A). The user's 161A interaction with source widget 155A and subsequent related user activities during a user session are identified and tracked by the source-related user activity calculator 145 in order to calculate source-related user activity measurements, in accordance with the methodologies described in detail below.

The networks 130 can include one or more local area networks (LAN), one or more wireless networks, one or more mobile communications networks, one or more wide area networks (WAN), such as the Internet, or similar communication systems, or combinations of such. The networks 130 can include one or more networking and/or computing devices such as wired and wireless devices. In one implementation, not all servers 101,103,105,120,140, and/or user devices 160A-B are directly connected to each other. The networks 130 may be separate networks.

The servers 101,103,105,120,140 can be hosted on one or more machines. The machines can include for example, and are not limited to, any data processing device, such as a desktop computer, a laptop computer, a mainframe computer, a server computer or any other device configured to process data.

A user device 160A-B can be a computing device such as a server computer, a desktop computer, a set-top box, a gaming console, a television, a portable computing device such as, and not limited to, mobile telephones, personal digital assistants (PDAs), portable media players, netbooks, laptop computers, a tablet computer, an electronic book reader, a wearable electronic device and the like. For example, user device 160A may be a laptop computer and user device 160B may be a tablet computer or a mobile smartphone.

Figure 2:
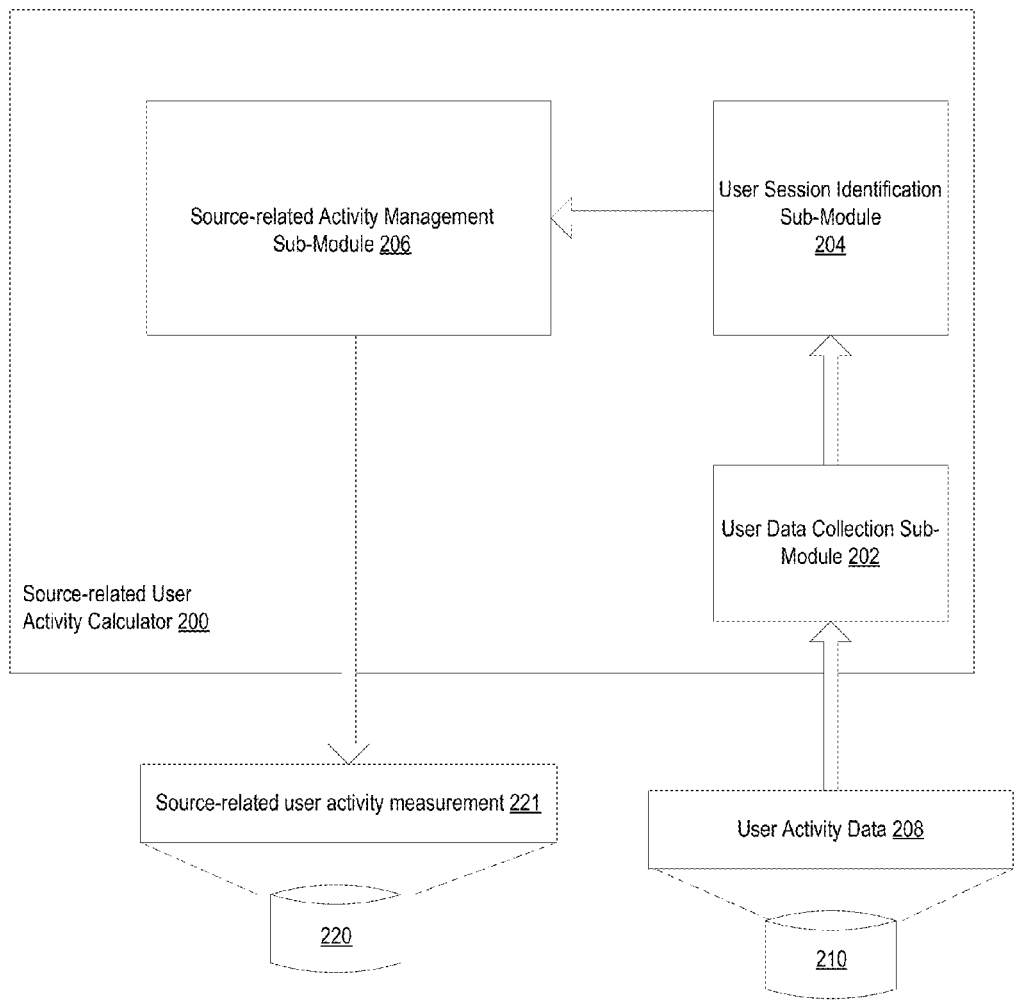
FIG. 2 is a block diagram of a source-related user activity calculator, in accordance with various implementations of the present disclosure.

FIG. 2 is a block diagram of a source-related user activity calculator 200 (e.g., source-related user activity calculator 145 of FIG. 1), in accordance with various implementations of the present disclosure. The source-related user activity calculator 200 can include a user data collection sub-module 202, a user session identification sub-module 204, and a source-related activity management sub-module 206. Note that in alternative implementations, the functionality of one or more of the user data collection sub-module 202, the user session identification sub-module 204, and the source-related activity management sub-module 206 may be combined or divided. Note that in alternative implementations, the functionality of the source-related user activity calculator 200 can be separate modules.

The source-related user activity calculator 200 can be coupled to one or more data stores 210, 220 that store data. In an implementation, the data stores 210, 220 can be persistent storage units. A persistent storage unit can be a local storage unit or a remote storage unit. Persistent storage units can be a magnetic storage unit, optical storage unit, solid-state storage unit, electronic storage units (main memory), or similar storage unit. Persistent storage units can be a monolithic device or a distributed set of devices. A 'set', as used herein, refers to any positive whole number of items.

The data stores 210, 220 can store input and/or output data. The modules (e.g., the user data collection sub-module 202, the user session identification sub-module 204, and the source-related activity management sub-module 206) can be coupled to the one or more data stores 210, 220 and can read from and write to the one or more data stores 210, 220.

According to implementations of the present disclosure, data store 210 is configured to store user activity data 208 collected by the user data collection sub-module 202. The user activity data may include information relating to user activity relating to one or more recommendation sources and one or more target publishers. According to implementations, the user activity includes any data relating to a user's electronic or web-based content consumption history. As detailed above, the user activity data may include any implicit or explicit data associated with a user's electronic actions or activity including, but not limited to, document visits, impressions, interactions, clicks on a source widget or source application, scrolling of document sections, pointing device (e.g., mouse or keyboard) movements, clicks or other indications, a time of activity relating to a document (e.g., a webpage and/or web site), a listing of web sites visited by a user, languages a user reads, viewing a document link (e.g., a recommendation) but not interacting with the document link (e.g., by hovering over the link), special interest indicators such as "thumbs up" indications or "thumbs down" indications, user explicit data such as categories, etc.

The user activity data may be collected for any quantity of users via any suitable methodology. For example, user activity data from multiple users may be collected by the user data collection sub-module 202 by storing a user identifier (e.g., a cookie stored on the user's browser) and/or using a user login (e.g., wherein a user is associated with login credentials which enable the collection of user data for that user across multiple devices and browsers). According to implementations, the user activity data may be collected on a persistent and ongoing basis such that the user data collection sub-module continually captures updated information regarding the activities of the users on a network. In an implementation, the user activity data may be collected "offline" relative to the provisioning and serving of content recommendations and/or the calculating of source-related user activity measurements (e.g., as an ongoing backend process supplementing the source-related user activity measurement calculation process).

According to implementations, the user data collection sub-module 202 is configured to identify all user activity data relating to a particular source and/or a particular target publisher during an activity window. In an embodiment, the activity window may be any suitable time period, such as, for example, 24 hours, 25 hours, etc. For example, the collected user activity data may include a set of interactions by one or more users with a source associated with a target publisher and a set of impressions (e.g., visits, page views) associated with the target publisher occurring during each activity window.

According to implementations of the present disclosure, the user session identification sub-module 204 is configured to identify a user session associated with a particular user based on the collected user activity data. In an implementation, the user session identification sub-module 204 determines the initiation of a user session by identifying a user interaction with a source. In an embodiment, the user session begins at a time of the initial user interaction with the source and ends after a selected time period (herein referred to as a "session period"). The session period may be any suitable length of time, such as for example, one hour.

In an implementation, the user session identification sub-module may combine multiple user sessions of the same user and target publisher. In an implementation, if a last instance of a particular user's user activity (e.g., a last impression) occurring during a first user session is within a "threshold period" of a first instance of user activity occurring during a subsequent user session (e.g., the particular user's interaction with the source which initiates a second user session) then the first and second user sessions may be combined. The threshold period may be any suitable period of time, such as, for example, one hour. In an implementation, when two user sessions are combined, the user's interaction with the source which initiated the second user session may be ignored or counted as a source-related user activity (e.g., an impression) occurring during the combined user session.

In an embodiment, having identified the user session (i.e., a beginning time marked by an interaction with the source and an ending time marked by the session period), the source-related activity management sub-module 206 identifies the user's activity relating to the target publisher (i.e., the source-related activity) occurring during the user session (e.g., during the time from the interaction with the source through the end of the session period). The source-related activity management sub-module 206 is configured to calculate a source-related user activity measurement 221 based on the identified user's source-related activity (e.g., impressions beginning with a source-related interaction) occurring during the user session. In an implementation, the source-related user activity measurement represents a measure of a quantity of user activity (e.g., impressions) relating to the target publisher that are associated with, related to, and/or derived from the initial interaction by a user with the source. In addition, an average source-related user activity measurement may be calculated which represents a user's source-related activities with respect to the target publisher during all of the user's sessions during the activity window. In an implementation, the source-related activity measurements 221 calculated by the source-related user activity calculator 200 may be stored in data store 220.

According to implementations, the source-related user activity calculator may derive the source-related user activity measurements for any combination of user and target publisher occurring during any desired activity window, as described below in detail with regard to FIGS. 3 and 4.

Figure 3:
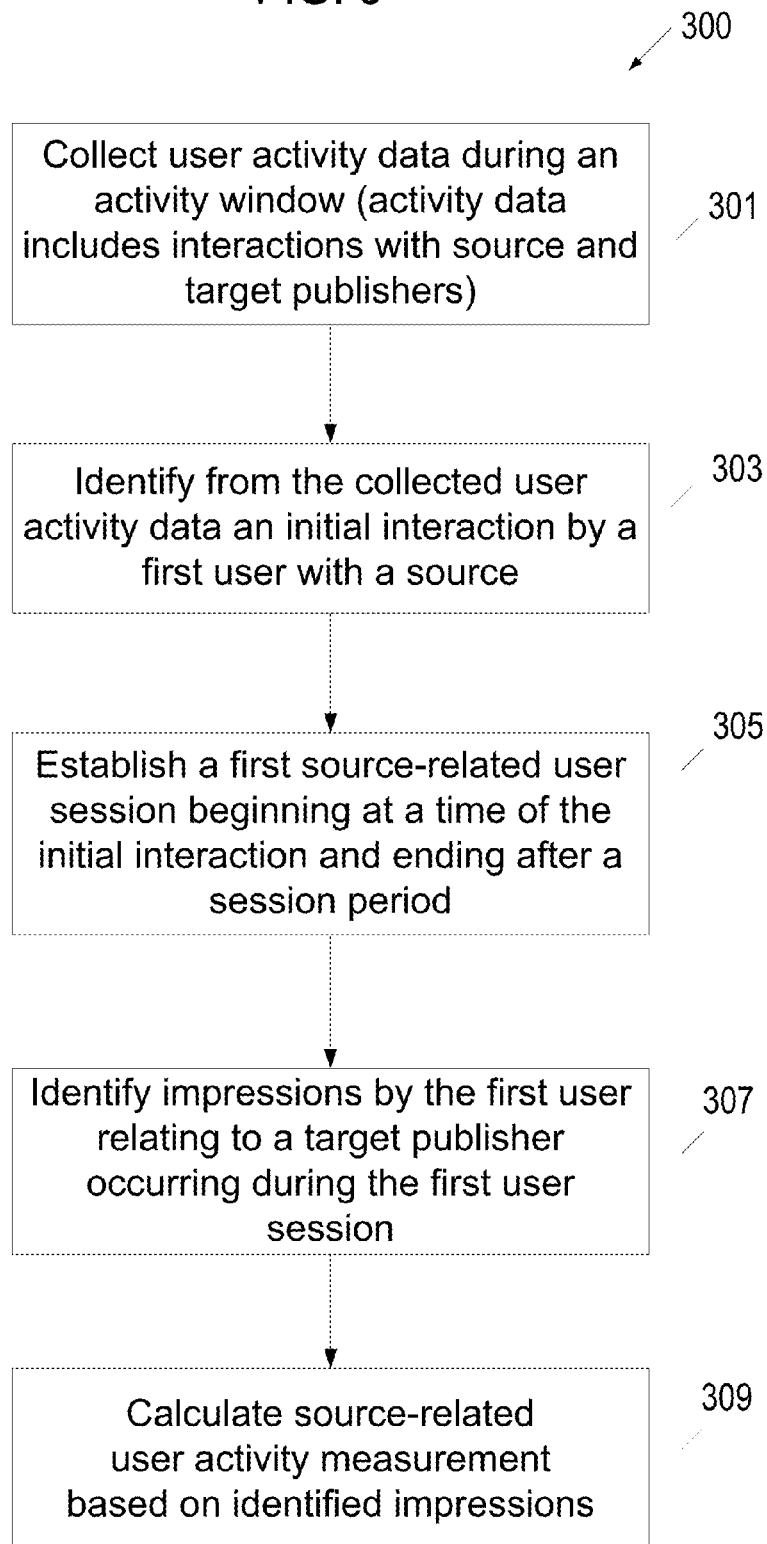
FIG. 3 is a flow diagram of an implementation of a method for calculating user engagement measurements.

FIG. 3 is a flow diagram of an exemplary implementation of a method 300 for calculating user engagement measurements including a source-related user activity measurement and an average source-related user activity measurement associated with a user and a target publisher. The method may be performed by processing logic that may comprise hardware (circuitry, dedicated logic, etc.), software (such as is run on a general purpose computer system or a dedicated machine), or a combination of both. In an implementation, the method 300 may be performed by the source-related user activity calculator 145 hosted in a server 140 of FIG. 1 or by the source-related user activity calculator 200 illustrated in FIG. 2.

At block 301, the source-related user activity calculator collects user activity data from multiple users of a network during an activity window. In an implementation, the activity window may be any period of time, such as for example, one day or a 25 hour period where a 24 hour session is extended by an hour to complete capturing user sessions started during the 24$^{th}$ hour. In an implementation, the user activity data may be collected for any quantity of users via any suitable methodology, including the use of user identifiers such as a cookie, user registration, scraping and/or crawling techniques, etc. In implementations, the user activity data may be collected periodically with any suitable frequency (e.g., every minute, every five minutes, every hour, every day, etc.). In implementations, the user activity data may be collected incrementally and aggregated on a per target publisher basis (e.g., for each potential target publisher on the network) and/or on a per particular user basis. According to an implementation, the user activity data may be collected using a Hadoop (e.g., map-reduce) framework for distributed, parallel and scalable data collection. In an implementation, the user activity data includes the multiple users' interactions with a recommendation source (e.g., a click on the source's widget) and activity relating to one or more target publishers (e.g., impressions, page views, visits relating to the target publisher).

In block 303, from the collected user activity occurring during the activity window, the source-related user activity calculator identifies an initial interaction by a particular user (also referred to as a "first user" or "User A") with a recommendation source. In an implementation, the initial interaction with the source may include a click on a link associated with recommendation content presented by a source widget. For example, as shown in FIG. 4, for a particular user (User A), an initial interaction (X1) with the source by User A is identified.

In block 305, in view of the identified initial interaction with the source, the source-related user activity calculator establishes a source-related user session (also referred to as a "first source-related user session"). In an implementation, the source-related user session begins at a time of the initial interaction by the particular user with the source and ends after a predetermined amount of time (referred to as the "session period"). In implementations, the session period may be any period of time, such as, for example, one hour.

Figure 4:
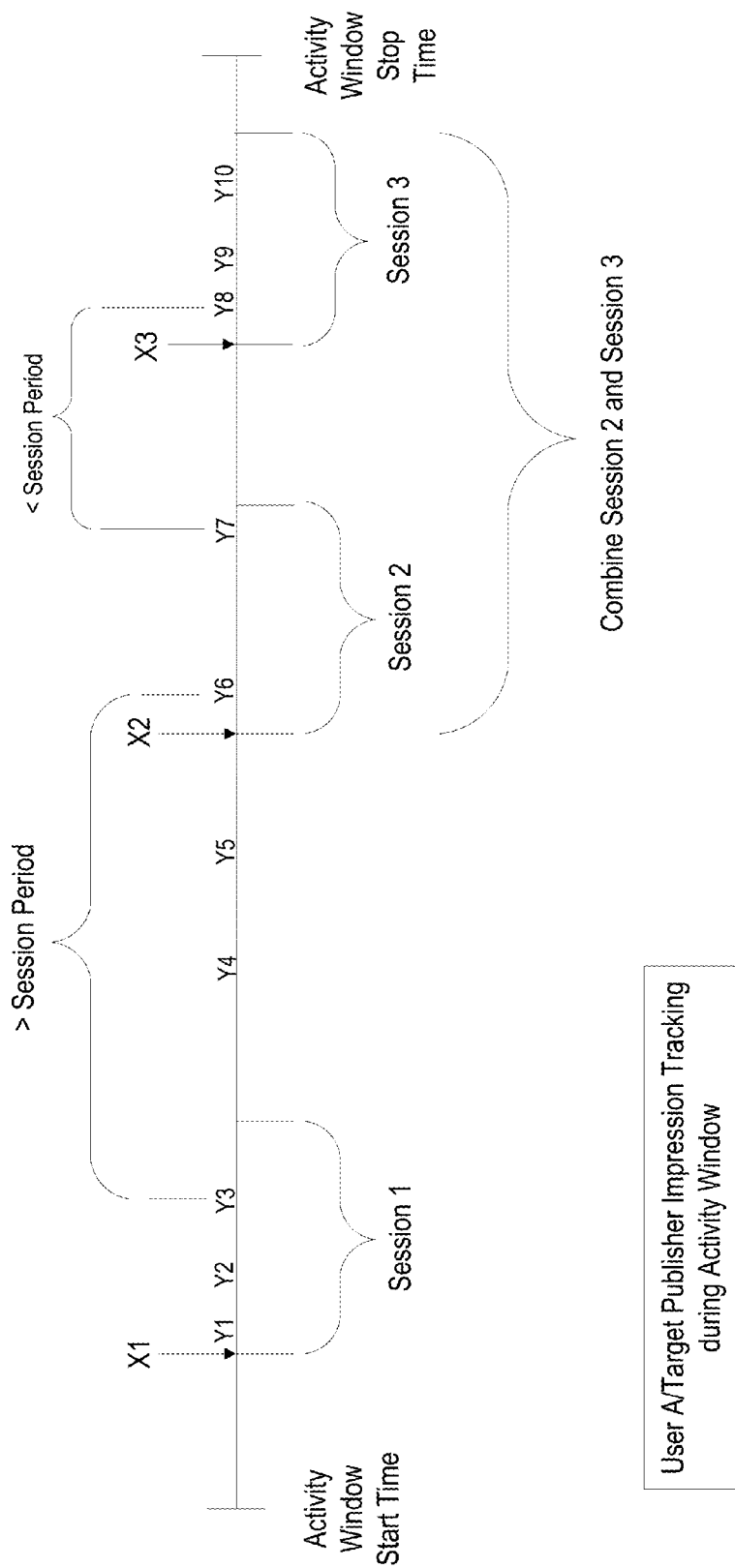
FIG. 4 illustrates an example of the instances of user activity during the user sessions, according to various implementations.

In the example, shown in FIG. 4, a session (Session 1) is established for User A which begins with the initial interaction with the source (X1) and ends after the session period (in this example, the session period is one hour).

In block 307, the source-related user activity calculator identifies the user activity (e.g., one or more impressions) relating to the target publisher which occur during the user session. In an implementation, an impression is identified and "added" to the user session if it has the same user (e.g., the first user or User A in FIG. 4) and the impression relates to the target publisher associated with the recommendation provided by the source and interacted with by the user during the initial interaction.

For example, as shown in FIG. 4, the source-related user activity calculator identifies the instances of user activity (e.g., impressions Y1, Y2, and Y3) which follow the initial interaction with the source and occur during the user session (Session 1). In this example, blocks 303-307 are performed in order to identify a second interaction with the source (e.g., X2), establishing a second user session (e.g., Session 2) and identifying the user activity occurring during the second user session (e.g., impressions relating to the target publisher Y6 and Y7). In addition, in this example, a third interaction with the source is identified (e.g., X3), a third user session is established (e.g., Session 3), and user activity occurring during Session 3 is identified (e.g., impressions relating to the target publisher Y8, Y9, and Y10).

In an implementation, multiple sessions of the same user and target publisher may be combined into a single session by the source-related user activity calculator. In an implementation, a first session may be combined with a subsequent session if the last impression of the first session occurs within a predetermined amount of time (e.g., the session period) of a first impression of the subsequent session. In an implementation, if the last impression of the first session does not occur during the session period of a first impression of the subsequent session, then the two sessions are not combined.

In the example shown in FIG. 4, the last impression of Session 1 (e.g., impression Y3) occurs more than the established session period (e.g., 1 hour) before the first impression of Session 2 (e.g., impression Y6). In this example, Session 1 and Session 2 are not combined.

With reference to FIG. 4, the last impression of Session 2 (e.g., impression Y7) occurs within the session period of the first impression of Session 3 (e.g., impression Y8). As such, in this example, Session 2 and Session 3 are combined.

In an implementation, when combining sessions, an initial interaction with the source (e.g., interaction X3) may be ignored and not counted as a session-initiating interaction, such that all of the user activity (e.g., impressions Y6, Y7, Y8, Y9, and Y10) may be combined into a single session (e.g., Session 2 of FIG. 4). In an implementation, the subsequent source-related interaction (e.g., interaction X3) may be counted as an instance of user activity and included with the other impressions in the combined user session (e.g., when Session 2 and Session 3 are combined, the impressions associated with Session 2 include Y6, Y7, X3, Y8, Y9, and Y10).

With reference to FIG. 3, in block 309, the source-related user activity calculator calculates a user engagement measurement (referred to as a "source-related user activity measurement") based on the one or more identified user sessions and the identified impressions occurring during the one or more user sessions. In an implementation, the source-related user activity measurement may be determined according to the following expression:

> Source-related user activity measurement=(a total quantity of impressions during all user sessions associated with a particular user occurring during an activity window)/(a number of user sessions associated with the particular user during the activity window).

In an implementation, the source-related user activity measurement represents an "average" quantity of source-related user activities relating to a target publisher (e.g., impressions attributed to, associated with and/or derived from an initial interaction with a source) occurring per user session during the activity window.

In an implementation, the source-related user activity calculator may be configured to remove one or more outlier user sessions from the set of identified user sessions when calculating the source-related user activity measurement. In an implementation, an outlier user session including zero user activity (e.g., no impressions) may be removed. For example, a user session having no impressions may be due to the related user not having a constant cookie or other methods for capturing the user activity. In another example, an outlier user session may be identified wherein a target document identifier associated with the first impression (e.g., page view of the target document) occurring in the user session after the initial interaction with the source does not match the target document identifier associated with the interaction in the source. In this example, the mismatch between the expected target document identifier and the actual target document identifier may be due to a technical error.

In an implementation, a high value of the source-related user activity measurement may indicate to a target publisher both a high degree of user engagement with content provided by the target publisher (i.e., the user has been targeted well with high-quality recommendations) and that the effective cost per click (CPC) is low. In an implementation, the effective CPC is a CPC paid by the target publisher divided by a quantity of source-related user activities.

In an implementation, the calculated source-related user activity measurement may be stored or maintained in tabular form in a database, and may be grouped by a particular recommendation (e.g., an recommendation clicked on as the source), by the source, by a time period (e.g., by a day, week, month, etc.).

In an implementation, the source-related user activity calculator is further configured to account for pages lacking any source tracking capabilities on the target publisher's website. In some instances, a target publisher may have the source associated with only some of its webpages or documents. For example, a target publisher may have the source widget installed on article pages, but not on the home page of the target publisher. In these instances, if only the impressions (e.g., visits to pages with the source widget) are identified/counted (e.g., in block 307 of FIG. 3), then the quantity of the impressions accumulated by the user after the source-related interaction may not be properly identified.

To address these instances, the source-related user activity calculator may be configured to estimate the likely number of missing impressions. In an implementation, for a given user session, the source-related user activity calculator may identify an impression in the target publisher's domain for which the referrer page (i.e., the last page the user viewed) is also in the target publisher's domain, but is not the previous "impression" identified for this user session. In such cases, the source-related user activity calculator may assume that the user was on a non-installed page (e.g., a page of the target publisher which does not include the source widget) and increment an additional "non-installed" impression count for that particular user session. In an implementation, the source-related activity calculator determines and tracks the non-installed impression count for the given user session. The non-installed impression count may be added to the quantity of impressions used to determine the source-related user activity measurement. According to an implementation, the non-installed impression may be given a weight which is less than the weight given to an identified impression. In an implementation, the non-installed impression count for a given session may be saved or maintained in a separate field in the stored record, since the non-installed impression count may be viewed as less accurate than the identified impressions. It is noted that the source-related user activity calculator may calculate the source-related user activity measurement with or without factoring in the non-installed impression count.

In an implementation, the source-related user activity measurement may be used in paid link optimization. For example, a source-related user activity measurement over a time period (e.g., one week) may be determined, wherein a weight assigned to an older portion of the time period (e.g., the beginning of the week) is less than weight assigned to the more recent portion of the time period (e.g., the end of the week). In an implementation, the referrer source can receive a higher grade if it leads to a higher source-related user activity measurement in the target source. For example, a referring website source link can be promoted to a more prominent position on the referring source website if it is resulting in a higher source-related user activity measurement. In an implementation, a minimum user session limit may be applied by the source-related user activity calculator, such that the source-related user activity measurement is used in paid link optimization only if the measurement is based on a quantity of sessions which is greater than the minimum user session limit (e.g., for statistical reliability).

Figure 5:
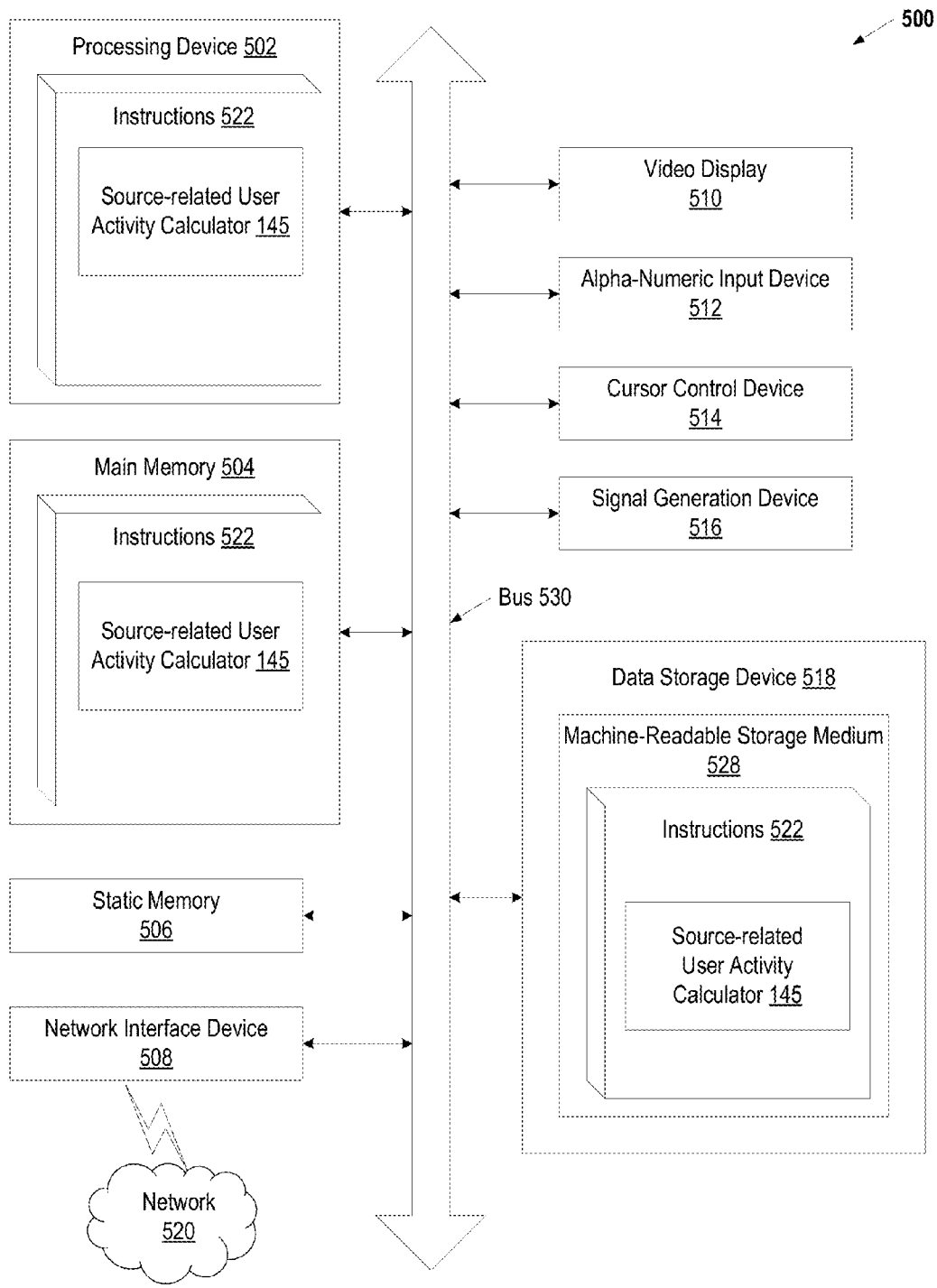
FIG. 5 is a block diagram of an example computer system that may perform one or more of the operations described herein, in accordance with various implementations.

FIG. 5 is a block diagram of an example computer system 500 that may perform one or more of the operations described herein, in accordance with various implementations In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (e.g., a processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 514, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 704. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 514 may include a computer-readable storage medium 524 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one implementation, the instructions 522 include instructions for an optimization module (e.g., source-related user activity calculator module 145 in FIG. 1) and/or a software library containing methods that call the optimization module. While the computer-readable storage medium 528 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "collecting", "establishing", "associating", "identifying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete and teachable fashion.

The terms "first", "second", "third", "fourth", etc. as used herein are meant as labels to distinguish among different elements and may not necessarily have an ordinal meaning according to their numerical designation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   providing, by a processing device, a content recommendation source application to be installed on a webpage associated with a target web site;
   collecting, by the processing device, user activity data associated with a plurality of users during an activity window, wherein the user activity data comprises information relating to interactions of the plurality of users with the content recommendation source application associated with the target web site;
   identifying, by the processing device, from the collected user activity data, a plurality of user sessions of the first user occurring during the activity window, wherein each of the plurality of user sessions is initiated by an interaction of the first user with the content recommendation source application;
   identifying, by the processing device, a set of impressions by the first user relating to the target web site occurring during the plurality of user sessions of the first user during the activity window;
   identifying, by the processing device, an outlier user session of the plurality of user sessions;
   removing, by the processing device, the outlier user session from the plurality of user sessions to identify a total quantity of user sessions of the first user occurring during the activity window;
   calculating, by the processing device, a source-related user activity measurement represented by a first quantity of impressions of the set of impressions divided by the total quantity of user sessions occurring during the activity window; and
   storing, by the processing device, the source-related user activity measurement in a data store.

2. The method of claim 1, further comprising:
   identifying a first user session beginning at a first time of a first interaction with the content recommendation source application and ending after a first session period;
   identifying a second user session beginning at a second time of a second interaction with the content recommendation source application and ending after a second session period;
   identifying a first set of impressions by the first user relating to the target web site occurring during the first user session;
   identifying a second set of impressions by the first user relating to the target web site occurring during the second user session;
   determining that a last impression of the first set of impressions occurs within the session period of a first impression of the second set of impressions; and
   combining the first set of impressions and the second set of impressions into an association with the first user session.

3. The method of claim 2, wherein the first interaction by the first user comprises a click of a link presented by the content recommendation source application installed on the webpage associated with the target web site.

4. A system comprising:
   a memory; and
   a processing device operatively coupled with the memory, the processing device configured to:
     provide a content recommendation source application to be installed on a webpage associated with a target web site;
     collect user activity data associated with a plurality of users during an activity window, wherein the user activity data comprises information relating to interactions of the plurality of users with the content recommendation source application associated with the target web site;
     identify, from the collected user activity data, a plurality of user sessions of the first user occurring during the activity window, wherein each of the plurality of user sessions is initiated by an interaction of the first user with the content recommendation source application;
     identify a set of impressions by the first user relating to the target web site occurring during the plurality of user sessions of the first user during the activity window;
     identify an outlier user session of the plurality of user sessions;
     remove the outlier user session from the plurality of user sessions to identify a total quantity of user sessions of the first user occurring during the activity window;
     calculate a source-related user activity measurement represented by a first quantity of impressions of the set of impressions divided by the total quantity of user sessions occurring during the activity window; and
     store the source-related user activity measurement in a data store.

5. The system of claim 4, the processing device further configured to:
   identify a first user session beginning at a first time of a first interaction with the content recommendation source application and ending after a first session period;
   identify a second user session beginning at a second time of a second interaction with the content recommendation source application and ending after a second session period;
   identify a first set of impressions by the first user relating to the target web site occurring during the first user session;
   identify a second set of impressions by the first user relating to the target web site occurring during the second user session;
   determine that a last impression of the first set of impressions occurs within the session period of a first impression of the second set of impressions; and combine the first set of impressions and the second set of impressions into an association with the first user session.

6. The system of claim 5, wherein the first interaction by the first user comprises a click of a link presented by the content recommendation source application installed on the webpage associated with the target web site.

7. A non-transitory computer readable storage medium comprising instructions thereon that, in response to execution by a processing device, cause the processing device to perform operations comprising:
  providing a content recommendation source application to be installed on a webpage associated with a target web site;
  collecting user activity data associated with a plurality of users during an activity window, wherein the user activity data comprises information relating to interactions of the plurality of users with the content recommendation source application associated with the target web site;
  identifying, from the collected user activity data, a plurality of user sessions of the first user occurring during the activity window, wherein each of the plurality of user sessions is initiated by an interaction of the first user with the content recommendation source application;
  identifying a set of impressions by the first user relating to the target web site occurring during the plurality of user sessions of the first user during the activity window;
  identifying, by the processing device, an outlier user session of the plurality of user sessions;
  removing, by the processing device, the outlier user session from the plurality of user sessions to identify a total quantity of user sessions of the first user occurring during the activity window;
  calculating, by the processing device, a source-related user activity measurement represented by a first quantity of impressions of the set of impressions divided by the total quantity of user sessions occurring during the activity window; and
  storing, by the processing device, the source-related user activity measurement in a data store.

8. The non-transitory computer readable storage medium of claim 7, the operations further comprising:
  identifying a first user session beginning at a first time of a first interaction with the content recommendation source application and ending after a first session period;
  identifying a second user session beginning at a second time of a second interaction with the content recommendation source application and ending after a second session period;
  identifying a first set of impressions by the first user relating to the target web site occurring during the first user session;
  identifying a second set of impressions by the first user relating to the target web site occurring during the second user session;
  determining that a last impression of the first set of impressions occurs within the session period of a first impression of the second set of impressions; and
  combining the first set of impressions and the second set of impressions into an association with the first user session.

9. The non-transitory computer readable storage medium of claim 8, wherein the first interaction by the first user comprises a click of a link presented by the content recommendation source application installed on the webpage associated with the target web site.

* * * * *